Patented June 20, 1950

2,512,410

UNITED STATES PATENT OFFICE 2,512,410

PROCESS FOR PRODUCING ALKYD RESINS AND RESINS OBTAINED THEREFROM

David E. Adelson and Harold F. Gray, Jr., Berkeley, Calif., assignors to Shell Development Company, San Francisco, Calif., a corporation of Delaware No Drawing. Application June 12, 1948, Serial No. 32,724

16 Claims. (Cl. 260—78.4)

This invention relates to the production of alkyd resins. More particularly, the invention relates to a novel process for the production of alkyd resins of polymeric allyl-type alcohols and polycarboxylic acids, and to the improved alkyd resins obtained therefrom.

More specifically the invention provides a practical and economical process for the production of alkyd resins of polymeric allyl-type alcohols and polycarboxylic acids which comprises reacting a linear polymeric ester of an allyl-type alcohol and a saturated monocarboxylic acid with a monomeric ester of a polycarboxylic acid in the presence of an ester-exchange catalyst so as to effect an exchange of acid radicals between the two different type ester molecules and produce the alkyd resin and a monomeric ester of the saturated monocarboxylic acid, and removing the formed monomeric ester from the reaction mixture during or at the completion of the reaction. The novel process is characterized by the economy and speed with which it may be carried out and by the exceptionally high quality resins that it produces. The alkyd resins produced by this novel process possess many properties, such as, for example, excellent color, increased resistance to water and alcohol, and improved film forming properties, which are far superior to the same properties possessed by similar resins produced by the inferior processes of the prior art.

This application is a continuation-in-part of our application Serial No. 509,951, filed November 10, 1943 now abandoned.

It has recently been discovered that alkyd resins may be produced from polymer allyl-type alcohols and polybasic acids. These new resins have heretofore, however, found little commercial use due to the relatively high cost involved in their production and to the fact that the resulting resins are deficient in many of the most important properties required of resins of this type. One of the chief causes for the high production cost is the difficulty in obtaining polymeric allyl-type alcohols of the desired quality. As it is difficult to obtain the polymeric allyl-type alcohols by a direct polymerization of the monomeric alcohols the more acceptable method is to produce the said polymeric alcohols by first forming a polymeric ester of the allyl-type alcohols and hydrolyzing the ester to form the desired polymeric alcohol. Polymeric alcohols produced by this method, however, are usually colored and contaminated with various harmful ingredients. Furthermore, the production difficulties are increased by the fact that it is necessary to utilize very exacting conditions as to temperature, pressure, etc. in order to accomplish the esterification of the polymeric alcohol to any satisfactory extent and even then a considerable number of the hydroxyl groups remain unesterified.

As free acids are utilized in the prior methods of production the resulting alkyd resins possess very high acid numbers and, thus, possess very poor film forming qualities. The presence of the free acids in the resin hastens oxidation and prevents the addition of many types of pigments, etc. Furthermore, as explained above, the direct esterification of the polyallyl-type alcohols can never be carried entirely to completion and there are always present a considerable number of free hydroxyl groups in the resin which cause it to have poor resistance to water and alcohol.

It is an object of the invention, therefore, to provide an improved method for the production of alkyd resins of polymeric allyl-type alcohols and polycarboxylic acids. It is a further object to provide a process for the production of alkyd resins of polymeric allyl-type alcohols and polycarboxylic acid which can be accomplished in a far more efficient and economical manner than any of the prior known methods. It is a further object to provide improved alkyd resins of polymeric allyl-type alcohols and polycarboxylic acids. It is still a further object to provide alkyd resins of polymeric allyl-type alcohols and polycarboxylic acids which possess very low acid numbers. It is a further object to provide alkyd resins of polymeric allyl-type alcohols and polycarboxylic acids which are devoid of free hydroxyl groups and possess superior resistance to water and alcohol. Other objects of the invention will be apparent from the detailed description given hereinafter.

It has now been discovered that these and other objects may be accomplished by the novel process of the invention which comprises reacting a linear polymeric ester of an allyl-type alcohol and a saturated monocarboxylic acid with a monomeric ester of a polycarboxylic acid in the presence of an ester-exchange catalyst, such as an alkali metal alcoholate, so as to effect an exchange of acid radicals between the two different type ester molecules and produce the alkyd resin and a monomeric ester of the saturated monocarboxylic acid, and removing the formed monomeric ester from the reaction mixture during or at the completion of the reaction. This novel process accomplishes the production of the desired alkyd resins without the use of the colored and expensive polyallyl-type alcohols and, in addition accomplishes the production of the resins in a much shorter time and under less critical conditions than was possible by the production methods utilized heretofore. Furthermore, the alkyd resins produced by this process possess many properties not possessed by the prior known resins, e. g. they possess a very low acid number due to the absence of any free acids in the production process and, in addition, possess excellent resistance to water and alcohols due to the absence of any free hydroxyl groups in the resin structure.

The polymeric esters of the allyl-type alcohols and the saturated monocarboxylic acids utilized in the process of the invention are produced by the polymerization of monomeric esters of allyl-type alcohols and saturated monocarboxylic acids. The term "allyl-type alcohols" as used throughout the specification and appended claims includes those unsaturated, monohydric alcohols, having an unsaturated linkage, preferably a double bond, between two carbon atoms of aliphatic character, one of which is attached directly to a saturated carbon atom which in turn is attached directly to the hydroxyl group.

Preferred allyl-type alcohols are those of the following general formula:

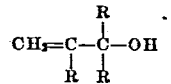

wherein each R is a member of the group comprising hydrogen, the halogen atoms, and hydrocarbon radicals. These preferred allyl-type alcohols may also be described as beta,gamma, olefinic unsaturated, monohydric alcohols wherein the carbon atom bearing the hydroxyl group is termed the alpha carbon atom and the unsaturated carbon atoms are termed the beta and gamma carbon atoms.

The hydrocarbon radicals which R may represent in the above-described formula may be saturated or unsaturated, cyclic, alicyclic or aromatic. Examples of the hydrocarbons which R may represent are the straight and branch-chained alkyl radicals, such as methyl, ethyl, isopropyl, tert-butyl, pentyl, 2,3-diethylpentyl, 2,4-dibutyloctyl, decyl, dodecyl, tetradecyl, pentadecyl, 3-butyldodecyl, and the like, the straight and branch-chained alkenyl radicals, such as isopropenyl, 2-butenyl, 2,5-diethyl-4-hexenyl, octenyl, 2-butyl-6-heptenyl, 5-pentyl-4-dedecenyl, pentadecenyl, and the like; the saturated and unsaturated cyclic radicals, such as cyclobutyl, cyclopentyl, cyclopentenyl, cyclohexenyl, 2-butyl-3-cyclopentenyl, 2,5-diethylcyclohexyl, and the like, and aromatic radicals, such as phenyl, tolyl, 3,5-dimethylphenyl and the like.

Examples of the allyl-type alcohols are allyl alcohol, methallyl alcohol, ethallyl alcohol, chloroallyl alcohol, buten-1-ol-3, 3-methyl-penten-1-ol-3, 2-methyl-buten-1-ol-3, 2-methyl-penten-1-ol-3, 2,3-dimethyl-buten-1-ol-3, hepten-1-ol-3, 4-methyl-hexen-1-ol-3, 5-methyl-hexen-1-ol-3, 4,4-dimethyl-penten-1-ol-3, octen-1-ol-3, 6-methyl-hepten-1-ol-3, 4-methyl-hepten-1-ol-3, 4,4'-dimethyl-hexen-1-ol-3, 3-phenyl-propen-ol-3, 3-tolyl-propen-1-ol-3, 3-xylyl-propen-1-ol-3, 4-phenyl-buten-1-ol-3, 4-tolyl-buten-1-ol-3, 4-xylyl-buten-1-ol-3, 3-naphthyl-propen-1-ol-3, 4-chloro-buten-1-ol-3, pentadien-1,4-ol-3, hexen-1-yn-5-ol-3, 2-methyl-penten-1-yn-4-ol-3, and 2,5-dimethyl-hexadien-1,5-ol-4. Other allyl-type alcohols are crotyl alcohol, tiglyl alcohol, 3-chloro-buten-2-ol-1, cinnamyl alcohol, hexadien-2,4-ol-1, hexadiene-2,5-ol-1, butadiene-2,3-ol-1, hexadien-3,5-ol-2, 2-methyl-hexen-2-ol, 2-methyl-penten-2-ol-1, 3,7-dimethyl-octadien-2,7-ol-1, cyclopenten-2-ol-1, cyclohexen-2-ol-1, etc.

A particularly preferred group of allyl-type alcohols are those of the general formula:

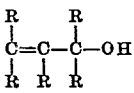

wherein each R is a member of the group comprising hydrogen and an open-chain hydrocarbon containing from 1 to 10 carbon atoms.

Examples of this particularly preferred group of alcohols are allyl alcohol, methallyl alcohol, ethallyl alcohol, 1-butyl 2-propen-1-ol, 1-hexyl 2-propen-1-ol, 2-hexenyl 2-propen-1-ol, 1,2-didecyl 2-propen-1-ol, 1-octyl 2-butyl 2-propen-1-ol, 1-isopropyl 2-propen-1-ol, 1-isohexyl 2-propen-1-ol, and the like.

The linear polymers to be utilized in the process of the invention are polymers of esters of the above-described allyl-type alcohols and saturated monocarboxylic acids. The saturated monocarboxylic acids used in producing these esters may be substituted or unsubstituted open-chain aliphatic, or alicyclic acids, such as acetic acid, chloroacetic acid, butyric acid, formic acid, propionic acid, chloropropionic acid, valeric acid, caproic acid, bromocaproic acid, caprylic acid, pelargonic acid, capric acid, lauric acid, stearic acid, palmitic acid, monodecanoic acid, cyclopentanoic acid, cyclohexanoic acid, and the like.

The preferred saturated monocarboxylic acids to be utilized in the esterification of the monomeric allyl-type alcohols are the unsubstituted, open-chain aliphatic acids containing from 1 to 15 carbon atoms. This preferred group of acids may be exemplified by formic acid, acetic acid, butyric acid, caproic acid, capric acid, lauric acid, and tridecanoic acid.

One or more of the above-described monocarboxylic acids may be utilized to esterify one or more of the above-described allyl-type alcohols. The production of these monomeric esters may be accomplished by any of the well known esterification methods. Examples of the monomeric esters of the allyl-type alcohols and the saturated monocarboxylic acids are allyl formate, allyl acetate, allyl propionate, allyl valerate, allyl laurate, allyl palmitate, methallyl acetate, chloroallyl butyrate, phenylallyl formate, methallyl chloroacetate, 2-isohexyl-2-propenyl formate, 2-decyl-2-propenyl laurate, 3-chloro-buten-2-yl palmitate, 4-xylyl-buten-2-yl caproate, ethallyl tridecanoate, 2-octyl-2-propenyl formate, 2-hexenyl laurate, and the like.

One or more of the above-described monomeric esters may be polymerized together to produce the linear polymer used as a reactant in the process of the invention. The linear polymers of the monomeric esters may be produced by any suitable polymerization process. Suitable processes comprise exposing the desired monomer or monomers to heat, light, polymerization catalysts, etc. As the molecular weight and structure of the polymeric ester will determine the molecular weight and structure of the desired alkyd resin the exact method utilized for the polymerization of the monomeric esters will depend chiefly on the type of alkyd resin desired as the final product.

A preferred group of linear polymers of the above-described monomeric esters which give excellent results when utilized in the process of the invention are those made up of from 3 to 15 monomer units joined together by carbon to carbon linkages and having the ester radicals separated by at least 4 and preferably 5 carbon atoms.

A suitable method for the production of these preferred linear polymers comprises heating the monomeric ester or esters in the presence of an oxygen-yielding catalyst at a temperature ranging from 50° C. to 250° C. When the lower range of temperatures are used, e. g. between 50° C. and 100° C., the resulting polymers will usually be made up of the larger number of monomer units. When the higher temperature ranges are utilized the polymer will be made up of the smaller number of monomer units.

The oxygen-yielding catalysts which may be used in the preferred process for polymerization comprise the compounds, such as the peroxides and molecular oxygen. The peroxide compounds, include benzoyl peroxide, hydrogen peroxide, barium peroxide, sodium peroxide, tetralin peroxide, acetyl peroxide, and the like. Other oxygen-yielding compounds are the alkali metal perborates and the alkali metal persulfates. A molecular oxygen containing gas is ordinarily a cheap catalyst. For this purpose air is well suited although pure oxygen or oxygen in admixture with other inert gases may also be used. When the oxygen containing gas is utilized as the catalyst the ester is heated and the gas is brought into intimate contact with the reactants; for example, by dispersing the gas into and through the reaction mass in the form of fine bubbles.

The preferred catalysts to be used in the polymerization process are the peroxide catalysts, such as benzoyl peroxide. The amount of these catalysts to be utilized will vary under the different conditions but in most cases will be between 0.01% to 5% of the total weight of reactants. Larger or smaller amounts may be used, however, if desired or necessary.

The polymerization may be conducted in the presence or absence of solvents or diluents. In case diluents or solvents are desired, compounds, such as benzene, toluene, heptane, naphtha and the like, may be used. Atmospheric, subatmospheric, or superatmospheric pressures may be used as desired in the polymerization process.

Any of the linear polymers of the above-described monomeric esters may be utilized in the process of the invention. The linear polymers of the monomeric esters may also be utilized in the process after they have been subjected to further treatment, such as being air blown or hydrogenated or treated with sulfur dioxide, in order to reduce any unsaturation which might be present in the polymeric esters.

The linear polymer esters of the allyl-type alcohols and the monocarboxylic acids or their hydrogenated product are reacted in the process of the invention with an ester of a polycarboxylic acid. The polycarboxylic acids used in producing the esters may contain two or more carboxy groups and may be open-chain aliphatic, alicyclic or aromatic. The acids may also be saturated or unsaturated. Examples of the saturated, open-chain aliphatic polycarboxylic acids are malonic, succinic, glutaric, adipic, pimelic, suberic, sebacic acids, and the like. Examples of the unsaturated, open-chain aliphatic polycarboxylic acids are the maleic acid, fumaric acid, glutaconic acid, and the like. Examples of the alicyclic polycarboxylic acids are 1,4-cyclohexanedicarboxylic acid, 1,3,5-cyclohexanetricarboxylic acid, 1,4-cyclopentanedicarboxylic acid, 1,4-cyclopentenedicarboxylic acid, and the like. Examples of the aromatic acids are phthalic acid, isophthalic acid, terephthalic acid, hemimellitic acid, 1,8-naphthalic acid, and the like.

A preferred group of polycarboxylic acids to be used in producing these esters are the dicarboxylic acids containing from 3 to 15 carbon atoms. Examples of this preferred group of acids are adipic acid, succinic acid, glutaric acid, phthalic acid, isophthalic acid, 1,8-naphthalic acid, and the like. A still more preferred group of polycarboxylic acids are the aromatic dicarboxylic acids containing less than 15 carbon atoms wherein the two carboxy groups are attached directly to ring carbon atoms. Examples of this preferred group are phthalic acid, isophthalic acid, and the like.

The alcohols used to esterify the above-described polycarboxylic acids are preferably the saturated monohydric alcohols, such as methyl alcohol, ethyl alcohol, butyl alcohol, isobutyl alcohol, amyl alcohol, heptyl alcohol, octyl alcohol, decyl alcohol, dodecyl alcohol, tetradecyl alcohol, cyclohexyl alcohol, cyclopentyl alcohol, and the like. As discussed hereinafter the preferred group of alcohols to be used to esterify the polycarboxylic acids are the saturated, open-chain, monohydric alcohols containing from 1 to 10 carbon atoms, such as methyl alcohol, ethyl alcohol, butyl alcohol, heptyl alcohol, and octyl alcohol.

Examples of the esters of the polycarboxylic acids which may be used in the process of the invention are diethyl phthalate, dibutyl, phthalate, dioctyl phthalate, dimethyl succinate, butyl ethyl phthalate, dioctyl adipate, diheptyl maleate, didecyl sebacate, didodecyl malonate, dicyclopentyl phthalate, and the like.

According to the process of the invention one or more of the above-described polymeric esters of the allyl-type alcohols and saturated monocarboxylic acids is reacted with one or more of the above-described esters of the polycarboxylic acids in the presence of an ester-exchange catalyst so as to effect an exchange of acid radicals between the two different types of ester molecules and produce the desired alkyd resin and a monomeric ester of the saturated monocarboxylic acid. In selecting the appropriate combination of esters to be used in the reaction it should be noted that in order for the reaction to operate efficiently under the condition that the monomeric ester formed in the reaction is removed by the preferred method of distillation the said ester should be more volatile than any of the initial esters. It is therefore desirable to select the polymer ester and the polycarboxylic acid ester with this thought in mind. Thus, if an alkyd resin of polymeric allyl alcohol and phthalic acid is desired as the final product an appropriate combination of esters to use as reactants would be a polymeric ester of allyl alcohol and acetic acid and diethyl phthalate. In this case the monomeric ester formed in the reaction, i. e. ethyl acetate, would be more volatile than the polyallyl acetate and diethyl phthalate, and could readily be removed by distillation.

The amount of the polymeric ester and the ester of the polycarboxylic acid to be used in the reaction will depend upon the particular type of alkyd resin desired as the final product. For example, if a resin is desired which contains each of the hydroxyl group of the polyallyl-type alcohol esterified with a polycarboxylic acid then the esters should be added to the reaction in sufficient amounts to furnish approximately equivalent amounts of monocarboxylic acid ester radicals and polycarboxylic acid ester radicals. However, if a resin is desired which contains some of the hydroxyl groups of the polymeric allyl-type alcohol esterified with the polycarboxylic acid and some esterified with the saturated monocarboxylic acid the esters should be added to the reaction in sufficient amount to maintain the monocarboxylic acid ester radicals in excess of the polycarboxylic acid ester radicals. There also may be cases where it is desired to produce resins containing an excess of the polycarboxylic acid esters, particularly in those cases where the polycarboxylic acid ester is of an aromatic structure and may be used as an internal chemically bound plasticizer for the resulting resin. In these cases an excess of the polycarboxylic acid esters should be maintained. In general, the esters should be added to the reaction in sufficient amounts to insure that the ratio of the monocarboxylic acid ester radicals and the individual polycarboxylic acid esters varies between 1:5 and 10:1. Preferably the esters are added to the reaction in sufficient amounts to maintain the ratio of the monocarboxylic acid ester radicals and the individual polycarboxylic acid esters between 1:1 and 10:1.

Any of the known ester-exchange catalysts may be utilized in the process. Examples of these catalysts are the alkali metal alcoholates, such as sodium and potassium alcoholates; acid catalysts, such as p-toluene sulfonic acid; metals, such as copper, nickel, tin, zinc; and other compounds, such as pyridine, aluminum alkoxides, sodium phenoxide, potassium carbonate, boron fluoride, mercury salts, and the like. The amount of the catalyst used will vary under the different conditions but in most cases will be between 0.01% to 5% by weight of total esters. Larger and smaller amounts may be used, however, if desired or necessary.

The reaction may be accomplished in the presence or absence of solvents or diluents. In case the solvents or diluents are desired, inert solvents, such as benzene, toluene and xylene, which do not interfere with the reaction, may readily be employed.

The temperature employed during the process of the invention may vary over a considerable range depending upon the type of reactants and catalysts to be employed. In most cases the temperature will range between about 50° C. to about 300° C., however, higher or lower temperatures may be employed if desired or necessary. Preferred temperatures to be used in the reaction range from 80° C. to 125° C.

In some cases it may be desirable to conduct the reaction in an inert atmosphere, such as nitrogen, but such a precaution is not essential to the success of the process. Atmospheric, superatmospheric, or subatmospheric pressures may be used.

The monomeric ester of the monocarboxylic acid formed in the exchange reaction may be removed during the reaction or it may be removed at the end of the process. The removal of the monomeric ester may be accomplished by any suitable means comprising distillation, extraction, fractional precipitation, and the like.

The resin obtained from the above-described reaction will in most cases be in an insoluble, fusible form and may be used as such or may be subjected to a further treatment to convert it to the desired insoluble, infusible stage. This may usually be accomplished by subjecting the resin to heat in the presence or absence of catalytic material, such as benzoyl peroxide, acetyl peroxide, tertiary butyl hydroperoxide, phthalic peroxide, cobalt, lead and manganese linoleate, naphthenate, aluminum chloride, stannic chloride, etc.

The resins may be modified in any of a variety of ways by use of a large number of modifying substances which may be added before, during or after the above-described process. Modifying substances include the drying oils, such as soy, linseed, perilla, fish, tung, sunflower, oiticica and dehydrated castor oil. Other modifiers include the organic plastic substances such as cellulose derivatives, protein plastics, natural resins and synthetic resins. Rosin is a common natural resin modifier. Phenol-aldehyde, urea-aldehyde, alkyd resins and synthetic linear polyamides represent condensation-type synthetic resin modifiers. Large numbers of synthetic resins resulting from the polymerization of unsaturated compounds can be used as modifiers. Typical examples are resins formed from styrene, alpha methyl styrene, vinyl chloride, vinylidene chloride, vinyl acetate, methyl acrylate, methyl methacrylate, and derivatives of some of these resins, such as polyvinyl alcohol, polyvinyl acetal, etc. Others are formed from polymerizable unsaturated cyclic compounds such as coumarone, indene, furfural and cyclohexene. Another group consists of plastics formed by the polymerization and copolymerization of conjugated diolefins such as butadiene, the pentadienes, the hexadienes, the heptadienes, the octadienes, and the nonadienes. Other modifiers include pitch, asphalt, gilsonite, asbestos, sand, clay, talc, mica, wood flour, rotten stone, cotton, gelatin, and the like.

The alkyd resins produced by the process of the invention may be utilized for a great variety of purposes. They may, for example, be molded, cast, drilled and machined into a variety of different shaped articles. They may also be utilized in the production of varnishes, baking enamels, paints, lacquers, adhesives, impregnating compositions, and the like. Their low acid number as well as their superior resistance to water makes them particularly adapted for use in the preparation of varnishes and paints which may be required to withstand long periods of exposure to the elements.

To illustrate how the invention may be carried out, the following examples are cited. It should be understood, however, that the examples are cited as illustrations only and should not be regarded as limiting the invention in any way. Parts are on a weight basis.

*Example I*

Monomeric allyl acetate was polymerized in the presence of 5% benzoyl peroxide at 65° C. 25.6 parts of the resulting polyallyl acetate were mixed with 5.7 parts of diethyl phthalate, 47 parts of ethyl alcohol and 0.16 part of metallic sodium as catalyst. The mixture was heated under reflux conditions in the presence of nitrogen with vigorous stirring. Another addition of 0.16 part metallic sodium was made during the reaction. The temperature was held at about 100° C. for 6 hours, at which time the mixture was subjected to distillation to remove the ethyl acetate and unreacted materials. The residue was washed with acetone, dissolved in isopropyl alcohol and the solution evaporated to dryness. The product obtained was a translucent, flexible alkyl resin possessing a low acid number and having excellent resistance to water and alcohol.

*Example II*

26.6 parts of polyallyl acetate formed in Example I were mixed with 11.8 parts of diethyl phthalate, 121.9 parts of ethyl alcohol and 0.2 part metallic sodium. The mixture was heated under reflux temperature for about 6 hours and then subjected to distillation to remove the ethyl acetate. The resulting solution was filtered and evaporated to dryness. The product obtained was a translucent hard solid having a low acid number and having excellent resistance to water.

*Example III*

36.6 parts of the polyallyl acetate were mixed with 24.6 parts of diethyl phthalate, 99.9 parts of ethyl alcohol and 0.37 part of metallic sodium. The mixture was heated in the presence of nitrogen at 100° C. for 6 hours. The product obtained after removal of ethyl alcohol and ethyl acetate was a hard, brittle solid.

*Example IV*

25 parts of polyallyl acetate are mixed with 27 parts of diethyl phthalate, 25.6 parts of ethyl alcohol and 0.16 part of metallic sodium. The mixture is heated under reflux conditions in the presence of nitrogen with vigorous stirring and after 6 hours the ethyl acetate formed is removed by distillation. The product obtained is a hard, translucent solid having low acid number and excellent resistance to water.

*Example V*

25 parts of a hydrogenated polyallyl caproate are mixed with 17 parts of diethyl phthalate, 100 parts of ethyl alcohol and 0.2 part metallic sodium. The resulting mixture is heated under reflux temperature for about 6 hours and then subjected to distillation to remove the ethyl caproate. The product obtained is a hard, flexible solid having low acid number and excellent resistance to water and alcohol.

*Example VI*

36.5 parts of polymethallyl butyrate are mixed with 30 parts of diethyl adipate, 121 parts of ethyl alcohol and 0.2 part of metallic sodium. The resulting mixture is heated under reflux temperature and during the reaction the ethyl butyrate is removed by distillation substantially as fast as it is formed. The product obtained is a translucent, hard solid.

*Example VII*

30 parts of polyallyl formate are mixed with 39 parts of dibutyl phthalate, 100 parts of methyl alcohol and 0.2 part of metallic sodium. The resulting mixture is heated under reflux for about 6 hours and then the butyl formate and unreacted material is removed by distillation. The product obtained is a hard, brittle solid.

*Example VIII*

25 parts of polycrotyl formate are mixed with 20.5 parts of dibutyl succinate, 55 parts of ethyl alcohol and 0.5 part of metallic sodium. The resulting mixture is heated under reflux temperature for about 5 hours and then subjected to distillation to remove the butyl formate. The resulting product is a hard, clear solid.

*Example IX*

100 parts of a polymer of bis(2-pentyl-2-propenyl) formate is mixed with 150 parts of dioctyl isophthalate, and 1 part of p-toluene sulfonic acid. The resulting mixture is heated for 7 hours and then subjected to distillation to remove octyl formate. The resulting product is a flexible translucent solid.

*Example X*

25 parts of polyethallyl acetate are mixed with 21 parts of each of the following polycarboxylic acid esters and 2 parts of p-toluene sulfonic acid: didecyl adipate, dihexyl chlorophthalate, dimethyl malonate, and diisopropyl sebacate.

The mixtures are heated under reflux temperature and then subjected to distillation to remove the monomeric ester of the monocarboxylic acid. In each case the resulting product is a hard translucent solid.

We claim as our invention:

1. A process for the production of an alkyd resin which comprises heating a linear homopolymer of allyl acetate which contains from 3 to 15 monomer units joined together through carbon to carbon linkages with diethyl phthalate and .5% sodium ethylate under reflux conditions, and removing the formed ethyl acetate from the reaction mixture by distillation, the homopolymer of allyl acetate and the diethyl phthalate being added to the reaction in such quantities that the ratio of the acetate ester radicals and the individual phthalic acid ester radicals is about 1:1.

2. Alkyd resins produced by process of claim 1.

3. A process for the production of an alkyd resin which comprises heating a linear homopolymer of allyl formate which contains from 3 to 15 monomer units joined together through carbon to carbon linkages with dibutyl phthalate and 0.01% to 5% sodium ethylate under reflux conditions, and removing the formed butyl formate from the reaction mixture by distillation, the homopolymer of the allyl formate and the dibutyl phthalate being added to the reaction in such quantities that ratio of formate ester radicals and phthalic acid ester radicals varies from 1:1 to 10:1.

4. Alkyd resins produced by process of claim 3.

5. A process for the production of an alkyd resin which comprises heating a linear homopolymer of methallyl butyrate which contains from 3 to 15 monomer units joined together through carbon to carbon linkages with diethyl adipate and 0.01% to 5% sodium alcoholate between 50° C. and 300° C. removing the ethyl butyrate formed in the reaction mixture by distillation, the homopolymer of the methallyl butyrate and the diethyl adipate being added to the reaction in such quantities that the ratio of the butyrate ester radicals and the adipic acid ester radicals varies from 1:1 to 10:1.

6. Alkyd resins produced by process of claim 5.

7. A process for the production of an alkyd resin which comprises heating a linear hydrogenated homopolymer of allyl caproate which contains 3 to 15 monomer units joined together through carbon to carbon linkages with diethyl phthalate and 0.01% to 5% of an alkali metal alcoholate between 50° C. and 300° C. and removing the ethyl caproate formed in the reaction mixture by distillation, the hydrogenated polymer and the diethyl phthalate being added to the reaction mixture in such quantities that the ratio of the caproate ester radicals and the adipic acid ester radicals and the phthalic acid ester radicals varies from 1:1 to 10:1.

8. Alkyd resins produced by process of claim 7.

9. A process for the production of an alkyd resin which comprises heating a linear homopolymer of allyl acetate with diethyl phthalate in the presence of an ester-exchange catalyst, and removing the formed ethyl acetate from the reaction mixture, the homopolymer of allyl acetate and the diethyl phthalate being added to the reaction mixture in such quantities that the ratio of the acetate ester radicals and the phthalic acid ester radicals varies from 1:5 to 10:1.

10. Alkyd resins produced by process of claim 9.

11. A process for producing alkyd resins comprising heating a linear polymer of an ester of (1) allyl alcohol and (2) a saturated monocarboxylic acid containing from 1 to 15 carbon atoms and containing no other reactive group than the carboxyl group, with a monomeric ester of (1) an open-chain, saturated monohydric alcohol containing from 1 to 10 carbon atoms and (2) a dicarboxylic acid containing from 3 to 15 carbon atoms which ester contains no other reactive groups than the two ester linkages, in the presence of an alkali metal alcoholate, and removing the formed monomeric ester of the saturated monocarboxylic acid from the reaction mixture, said linear polymer and monomeric ester of the open-chain, saturated monohydric alcohol and dicarboxylic acid being initially added to the reaction mixture in such quantities that the ratio of the ester radicals in the linear polymer and the ester radicals in the monomeric ester varies from 1:5 to 10:1.

12. Alkyd resins produced by the process of claim 11.

13. A process for producing alkyd resins comprising heating a linear polymer of the group consisting of hydrogenated linear polymers and unhydrogenated linear polymers of an ester of (1) a beta,gamma-olefinic unsaturated, monohydric alcohol containing no other reactive group than the hydroxyl group and (2) a saturated monocarboxylic acid containing no other reactive group than the carboxyl group, with a monomeric ester of (1) an aliphatic monohydric alcohol and (2) a polycarboxylic acid which ester contains no other reactive groups than the ester linkages, in the presence of an ester-exchange catalyst, and removing the formed monomeric ester of the saturated monocarboxylic acid from the reaction mixture, said linear polymer and monomeric ester of the aliphatic monohydric alcohol and polycarboxylic acid being added to the reaction mixture in such quantities that the ratio of the ester radicals in the linear polymer and the ester radicals in the monomeric ester varies from 1:5 to 10:1.

14. Alkyd resins produced by the process of claim 13.

15. A process for producing alkyd resins comprising heating a linear polymer of an ester of (1) a beta,gamma-olefinic unsaturated aliphatic monohydric alcohol, and (2) a saturated monocarboxylic acid containing from 1 to 15 carbon atoms, with a monomeric ester of (1) an open-chain saturated monohydric alcohol containing from 1 to 10 carbon atoms, and (2) a dicarboxylic acid containing from 3 to 15 carbon atoms, in the presence of an ester-exchange catalyst, and removing the formed monomeric ester of the saturated monocarboxylic acid from the reaction mixture, said linear polymer and monomeric ester of the dicarboxylic acid possessing no other groups that are reactive toward each other under the aforedescribed conditions than the ester groups, and said polymer and monomeric ester being added to the reaction mixture in such quantities that the ratio of the ester radicals in the linear polymer and in the monomeric ester varies from 1:5 to 10:1.

16. Alkyd resins produced by the process of claim 15.

DAVID E. ADELSON.
HAROLD F. GRAY, Jr.

REFERENCES CITED

The following references are of record in the file of this patent:

UNITED STATES PATENTS

| Number | Name | Date |
|---|---|---|
| 2,012,267 | Carothers | Aug. 27, 1935 |
| 2,332,460 | Muskat et al. | Oct. 19, 1943 |
| 2,401,959 | Pfann et al. | June 11, 1946 |
| 2,435,429 | Evans et al. | Feb. 3, 1948 |
| 2,437,046 | Rothrock et al. | Mar. 2, 1948 |